United States Patent
Liu et al.

(10) Patent No.: US 12,439,412 B2
(45) Date of Patent: Oct. 7, 2025

(54) SRS CONFIGURATION FOR NON-CODEBOOK BASED PUSCH TRANSMISSION

(71) Applicant: LENOVO (BEIJING) LIMITED, Beijing (CN)

(72) Inventors: Bingchao Liu, Beijing (CN); Chenxi Zhu, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 459 days.

(21) Appl. No.: 17/279,582

(22) PCT Filed: Nov. 9, 2018

(86) PCT No.: PCT/CN2018/114794
§ 371 (c)(1),
(2) Date: Mar. 25, 2021

(87) PCT Pub. No.: WO2020/093362
PCT Pub. Date: May 14, 2020

(65) Prior Publication Data
US 2021/0392671 A1 Dec. 16, 2021

(51) Int. Cl.
*H04W 72/23* (2023.01)
*H04L 5/00* (2006.01)
(Continued)

(52) U.S. Cl.
CPC .......... *H04W 72/23* (2023.01); *H04L 5/0051* (2013.01); *H04W 72/1263* (2013.01); *H04W 72/54* (2023.01)

(58) Field of Classification Search
None
See application file for complete search history.

(56) References Cited

U.S. PATENT DOCUMENTS 10,952,231 B2 * 3/2021 Liou .................. H04L 5/0051
11,218,340 B2 * 1/2022 Wu .................... H04L 5/0007
(Continued)

FOREIGN PATENT DOCUMENTS

WO 2018200196 A1 11/2018
WO WO-2020034443 A1 * 2/2020 ........... H04B 7/0404

OTHER PUBLICATIONS

3GPP TS 38.214 V15.3.0 Physical layer procedures for data (Release 15) (Year: 2018).*
(Continued)

*Primary Examiner* — Luna Weissberger
(74) *Attorney, Agent, or Firm* — Kunzler Bean & Adamson

(57) ABSTRACT

Methods, a base unit and a remote unit are disclosed. According to one embodiment, a method at abase unit, comprise: transmitting higher layer parameters to configure two or more sounding reference signal (SRS) resource sets for a non-codebook based physical uplink share channel (PUSCH) transmission, the SRS resources in same SRS resource set are configured with same spatial relation information, and configuring and transmitting a quasi co-location (QCL) information for a non zero power (NZP) channel state information reference signal (CSI-RS) resource, in the condition that aperiodic NZP CSI-RS resource is associated with the SRS resource set for non-codebook based PUSCH transmission.

17 Claims, 5 Drawing Sheets

(51) Int. Cl.
*H04W 72/1263* (2023.01)
*H04W 72/54* (2023.01)

(56) References Cited

U.S. PATENT DOCUMENTS

| | | |
|---|---|---|
| 2016/0006547 A1 | 1/2016 | Kang et al. |
| 2017/0288743 A1 | 10/2017 | Nam et al. |
| 2018/0242327 A1 | 8/2018 | Frenne et al. |
| 2019/0356364 A1* | 11/2019 | Maamari ............... H04L 5/0062 |
| 2021/0329673 A1* | 10/2021 | Gao ...................... H04L 5/0051 |
| 2021/0400668 A1* | 12/2021 | Matsumura ............. H04L 5/003 |
| 2022/0376760 A1* | 11/2022 | Rahman ............... H04B 7/0626 |

OTHER PUBLICATIONS

International Searching Authority, "Notification of Transmittal of the International Search Report and the Written Opinion of the International Searching Authority, or the Declaration", PCT/CN2018/114794, Nov. 9, 2018, pp. 1-7.

Lenovo, Motorola Mobility, Remaining Issues on Non-codebook Based Transmission for UL, 3GPP TSG RAN WG1 #92, R1-1801824, Feb. 26-Mar. 3, 2018, pp. 1-2, Athens, Greece.

OPPO, Remaining issue on non-codebook based UL transmission, 3GPP TSG RAN WG1 Meeting #92bis, R1-1803968, Apr. 16-Apr. 20, 2018, pp. 1-5, Sanya China.

Nokia, Nokia Shanghai Bell, Summary of issues on UL non-codebook based transmission, 3GPP TSG RAN WG1 Meeting #92, R1-1803306, Feb. 26-Mar. 2, 2018, pp. 1-22, Athens, Greece.

* cited by examiner

SRS CONFIGURATION FOR NON-CODEBOOK BASED PUSCH TRANSMISSION

FIELD

The subject matter disclosed herein generally relates to wireless communications and, more particularly, to SRS (Sounding Reference Signal) configurations for non-codebook based physical uplink share channel (PUSCH) transmission with multiple antenna panels and/or multiple beams.

BACKGROUND

The following abbreviations are herewith defined, some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), New Radio (NR), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Multiple-Input Multiple-Output (MIMO), Frequency Range 2 (FR2), Physical Uplink Shared Channel (PUSCH), Physical Downlink Control Channel (PDCCH), Sounding Reference Signal (SRS), SRS Resource Indicator (SRI), Downlink Control Information (DCI), Resource Block (RB), Non Zero Power (NZP) Channel State Information Reference Signal (CSI-RS), Control Resource Set (CORESET), Bandwidth Part (BWP), Quasi Co-location (QCL), Transmission Configuration Indicator (TCI).

The SRS is a reference signal transmitted by the UE in the uplink direction which is used by the gNB to estimate the uplink channel quality over a wide bandwidth. The gNB may use the estimated channel quality to determine the uplink and/or downlink transmission schemes.

BRIEF SUMMARY

Methods and apparatuses for SRS configurations for non-codebook based PUSCH transmission with multiple antenna panels and/or multiple beams are disclosed.

In one embodiment, a method at a base unit, comprises: transmitting higher layer parameters to configure two or more SRS resource sets for a non-codebook based PUSCH transmission, the SRS resources in same SRS resource set are configured with the same spatial relation information, and configuring and transmitting a quasi co-location (QCL) information for a non zero power (NZP) channel state information reference signal (CSI-RS) resource, in the condition that aperiodic NZP CSI-RS resource is associated with the SRS resource set for non-codebook based PUSCH transmission.

In another embodiment, a method at a base unit, comprises: transmitting higher layer parameters to configure one SRS resource set including at least two SRS resources for a non-codebook based PUSCH transmission with different spatial relation information, configuring and transmitting one or more NZP CSI-RS resources associated with the one SRS resource set, and configuring and transmitting one or more QCL information for each of the NZP CSI-RS resources, in the condition that aperiodic NZP CSI-RS resource is associated with the SRS resource set.

In another embodiment, a method at a remote unit, comprises: receiving higher layer parameters for configuring two or more SRS resource sets for non-codebook based UL transmission and each is associated with one NZP CSI-RS resource, receiving one DCI including two or more SRI fields, and transmitting PUSCH with two or more codewords.

In another embodiment, a method at a remote unit, comprises: receiving higher layer parameters for configuring one SRS resource set for non-codebook based UL transmission and the one SRS resource set is associated with one or more NZP CSI-RS resources, receiving one DCI including one SRI field with two or more parts, and transmitting PUSCH with two or more codewords.

In another embodiment, a base unit, comprises: a transceiver; a memory; a processor coupled to the transceiver and the memory and configured to: transmit higher layer parameters to configure two or more SRS resource sets for a non-codebook based PUSCH transmission, the SRS resources in same SRS resource set are configured with same spatial relation information, and configure and transmit a QCL information for a CSI-RS resource, in the condition that aperiodic NZP CSI-RS resource is associated with the SRS resource set for non-codebook based PUSCH transmission.

In another embodiment, a base unit, comprises: a transceiver; a memory; a processor coupled to the transceiver and the memory and configured to: transmit higher layer parameters to configure one SRS resource set including at least two SRS resources for a non-codebook based PUSCH transmission with different spatial relation information, configure and transmit one or more NZP CSI-RS resources associated with the one SRS resource set, and configure and transmit one or more QCL information for each of the NZP CSI-RS resources, in the condition that aperiodic NZP CSI-RS resource is associated with the SRS resource set.

In another embodiment, a remote unit, comprises: a transceiver; a memory; a processor coupled to the transceiver and the memory and configured to: receive higher layer parameters for configuring two or more SRS resource sets for non-codebook based UL transmission and each is associated with one NZP CSI-RS resource, receive one DCI including two or more SRI fields, and transmit PUSCH with two or more codewords.

In another embodiment, a remote unit, comprises: a transceiver; a memory; a processor coupled to the transceiver and the memory and configured to: receive higher layer parameters for configuring one SRS resource set for non-codebook based UL transmission and the one SRS resource set is associated with one or more NZP CSI-RS resources, receive one DCI including one SRI field with two or more parts, and transmit PUSCH with two or more codewords.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
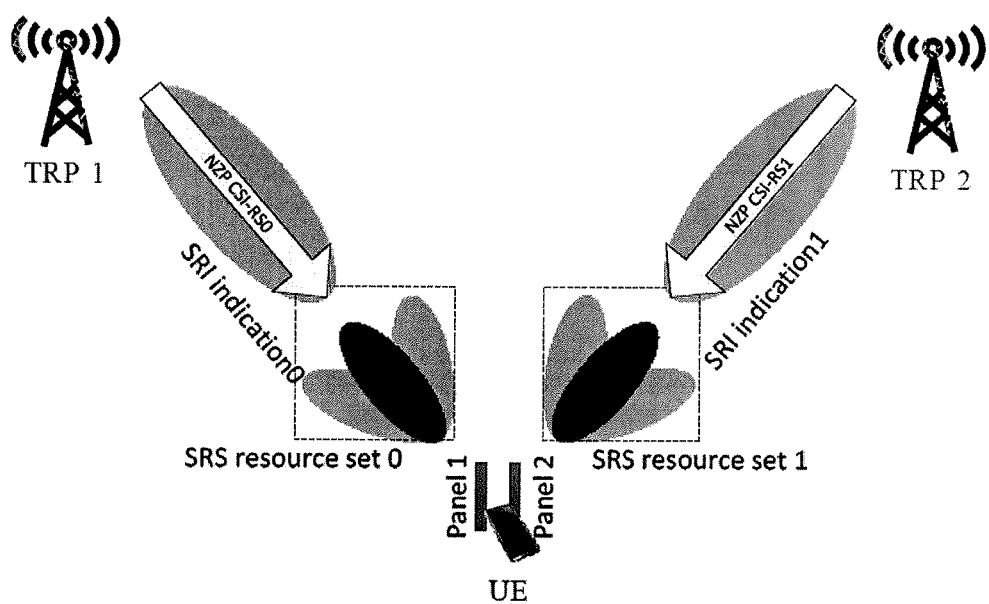
FIG. 1 is a schematic diagram illustrating multiple SRS resource sets configuration for non-codebook based PUSCH transmission with multi-panel and multi-TRP according to one embodiment.

As will be appreciated by one skilled in the art, aspects of the embodiments may be embodied as a system, apparatus, method, or program product. Accordingly, embodiments may take the form of an entire hardware embodiment, an entire software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scene, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The description of elements in each figure may refer to elements of proceeding figures. Like numbers refer to like elements in all figures, including alternate embodiments of like elements.

In new radio (NR), codebook-based transmission is used by the network to decide an uplink transmission rank, i.e., the number of layers to be transmitted, and a corresponding precoder matrix to be used for the transmission. The network informs the UE about the selected transmission rank and precoder matrix as part of the uplink scheduling grant. At the UE side, the precoder matrix is applied for the scheduled PUSCH transmission, mapping the indicated number of layers to the antenna ports. In contrast, non-codebook-based transmission is based on UE measurements and UE determine its preferred precoder for the PUSCH transmission. Based on downlink measurements, the UE selects a suitable uplink precoder. Non-codebook-based precoding is based on an assumption of channel reciprocity, that is, the UE can acquire detailed knowledge of the uplink channel based on downlink measurements.

Non-codebook based UL transmission was supported in NR Release 15, while only transmission from single panel using single beam is supported. Support of multi-panel/multi-transmit-receive point (TRP) UL MIMO operation will be included in NR Release 16. Enhancements on multi-TRP/panel transmission include improved reliability and robustness with both ideal and non-ideal backhaul. Specifying UL transmit beam selection for multi-panel operation will facilitate panel-specific beam selection. The non-codebook based PUSCH transmission cannot work well in FR2 based on the Rel-15 as described in TS 38.214 since the UE cannot determine the QCL assumption to receive the associated NZP CSI-RS. The CSI-RS is located in the same slot as the SRS request field contained in the DCI. If the UE configured with aperiodic SRS associated with aperiodic NZP CSI-RS resource, any of the TCI states configured in the scheduled component carrier (CC) shall not be configured with 'QCL-TypeD'. Single panel based non-codebook based PUSCH transmission can be scheduled by DCI format 0_1 with a single SRI in Release-15, the SRI defined in the DCI is used to indicate the precoder for PUSCH transmission.

For the case that a UE equipped with two or more panels and PUSCH or SRS from any two panels can be transmitted simultaneously in FR2, a dedicated SRI is needed for each panel to indicate the spatial relation for the PUSCH from this panel.

This invention is aimed to support non-codebook based PUSCH transmission for the UE equipped with multiple panels communicates with one or more TRPs.

FIG. 1 illustrates one embodiment of a wireless communication system.

One typical scenario (scenario 1) is that the UE transmits PUSCH with multiple panels (e.g. Panel 1 and Panel 2 as shown in FIG. 1) to multiple TRPs (e.g. TRP 1 and TRP 2 as shown in FIG. 1) simultaneously using different beams as illustrated in FIG. 1. At least one SRI (e.g. SRI indication 0 and SRI indication 1 as shown in FIG. 1) should be indicated for the PUSCH transmission from each panel for precoder and/or beam indication. And the corresponding SRS configuration should also be enhanced to support this operation.

Only single panel based UL transmission can be supported in current Release-15 NR. The scheme defined in Rel-15 NR cannot support the scenario illustrated in FIG. 1. The difference between single-panel and multi-panel cases is that the UE should use multiple beams to transmit PUSCH through multiple panels. The main issue in the scenario shown in FIG. 1 is how to indicate two or more transmission beams and how to determine the precoder for multiple panels and the relevant SRS configurations.

According to one embodiment, two or more SRS resource sets (e.g. SRS resource set 0 and SRS resource set 1 as shown in FIG. 1) each with one or more SRS resources should be configured by higher layer parameters for a UE with usage set to 'nonCodebook' if the uplink transmission scheme is set to 'nonCodebook', and one NZP CSI-RS resource should be associated with each SRS resource set, for example, NZP CSI-RS 0 is associated with SRS resource set 0, and NZP CSI-RS 1 is associated with SRS resource set 1 as shown in FIG. 1. Only one SRS port can be configured for each SRS resource.

All SRS resources within one SRS resource set should be configured with the same spatial relation information, for example with same spatialRelationInfo value. Here, the spatialRelationInfo is used to indicate the transmission beam for SRS resource. SRS resources from different SRS resource sets can be configured to the UE in the same resource block (RB) for simultaneous transmission.

The quasi co-location information is used to indicate the receiver beam to receive the NZP CSI-RS. If the UE configured with aperiodic SRS associated with aperiodic NZP CSI-RS resource, qcl-info shall be configured for the CSI-RS resource in the SRS-config information element (IE) as shown in Table 1 for the UE to determine the QCL assumption to receive the associated CSI-RS. In table 1, the qcl-Info is indicated with one TCI-StateID.

not configure qcl-info for the UE, the UE can receive the NZP CSI-RS using the beam indicated by spatialRelationInfo for SRS transmission.

If the offset between the reception of the UL grant carrying the SRS request and the transmission of corresponding aperiodic NZP CSI-RS is equal or larger than a UE reported threshold, e.g. the UE reported ThresholdSched-Offset, two alternatives are provided to determine the QCL assumption for the NZP CSI-RS reception:

Alt.1: The UE determines the QCL assumption according to the qcl-info parameter configured by higher layer parameters if qcl-info is configured.

Alt.2: The UE determines the QCL assumption according to the spatialRelationInfo parameter configured by higher layer parameters if qcl-info is not configured.

If the offset between the reception of the UL grant carrying the SRS request and the transmission of corresponding aperiodic NZP CSI-RS is less than the UE reported ThresholdSched-Offset, two alternatives are provided for the UE to determine the QCL assumption for the NZP CSI-RS reception:

Alt.1: The UE assumes that the NZP CSI-RS is quasi co-located with the RS(s) in the TCI state with respect to the QCL parameter(s) used for PDCCH quasi co-location indication of the lowest CORESET-ID in the latest slot in which one or more CORESETs within the active bandwidth part (BWP) of the serving cell are configured for the UE.

Alt.2: The UE assumes that the NZP CSI-RS is quasi co-located with the RS(s) in the TCI state with respect to the QCL parameter(s) used for PDCCH quasi co-location indication of the CORESET carrying the DCI including the SRS request.

For the multiple SRS resource sets configured for a non-codebook solution, multiple SRI fields should be con-

TABLE 1 qcl-Info for associated aperiodic NZP CSI-RS resource

```
SRS-ResourceSet ::=                    SEQUENCE {
    srs-ResourceSetId                      SRS-ResourceSetId,
    srs-ResourceIdList                     SEQUENCE (SIZE(1..maxNrofSRS-ResourcesPerSet)) OF SRS-ResourceId
OPTIONAL,  -- Cond Setup
    resourceType                           CHOICE {
        aperiodic                              SEQUENCE {
            aperiodicSRS-ResourceTrigger           INTEGER (1..maxNrofSRS-TriggerStates-1),
            csi-RS                                 NZP-CSI-RS-ResourceId
OPTIONAL,  -- Cond NonCodebook
            qcl-info                               TCI-StateID
OPTIONAL,  -- Need S
            slotOffset                             INTEGER (1..32)
OPTIONAL,  -- Need S
        ...,
    },
``` qcl-info
For the associated aperiodic NZP CSI-RS, it contains a reference to one TCI-State in TCI-States for providing the QCL source and QCL type.

The UE shall receive DCI and NZP CSI-RS using the same or different beams. Time gap is needed for the UE to switch between beams. If the offset between the reception of the DCI carrying the SRS request and the transmission of corresponding aperiodic NZP CSI-RS is not enough, the UE may have no time to switch the receiving beam. For the UE with beam correspondence, the transmitting beam is the same as the receiving beam. For the case that the gNB does tained in the UL grant to schedule a multiple codewords (CW) (e.g. CW0 and CW1 as shown in FIG. 1) based PUSCH transmission. Each SRI field is used to indicate the SRS resources defined in the corresponding SRS resource set. The UE determines the precoding matrix and the transmission rank for each CW according to the corresponding SRI fields. SRI indication defined in TS38.212 in Release 15 is reused for each SRI part.

Figure 2:
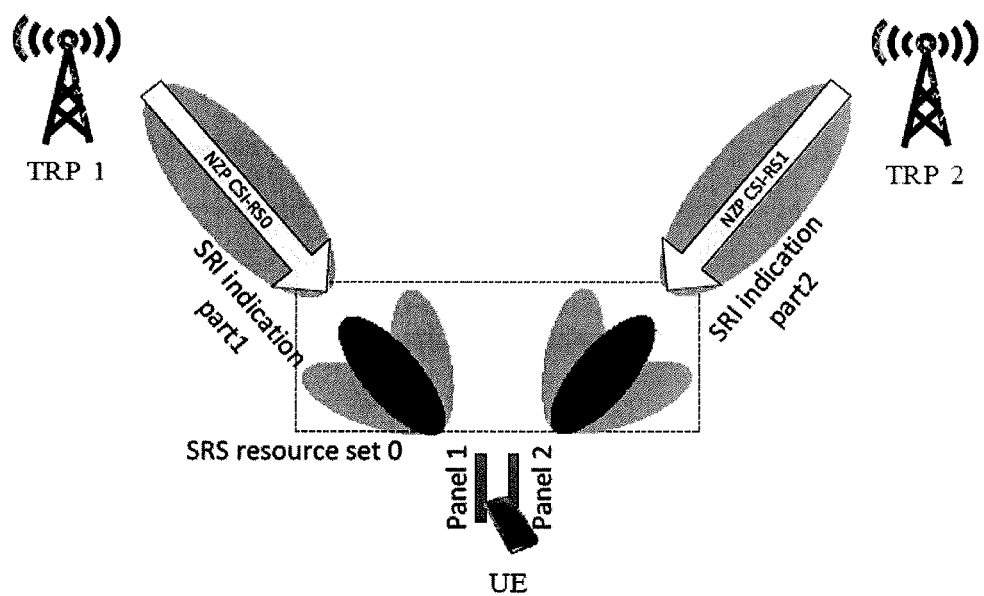
FIG. 2 is a schematic diagram illustrating single SRS resource set configuration for non-codebook based PUSCH transmission with multi-panel and multi-TRP according to another embodiment.

FIG. 2 is a schematic diagram illustrating single SRS resource set configuration for non-codebook based PUSCH transmission with multi-panel and multi-TRP according to another embodiment.

Another typical scenario (scenario 2) is that the UE transmits PUSCH with multiple panels (e.g. Panel 1 and Panel 2 as shown in FIG. 2) to multiple TRPs (e.g. TRP 1 and TRP 2 as shown in FIG. 2) simultaneously using different beams as illustrated in FIG. 2. Single SRS resource set (e.g. SRS resource set 0 as shown in FIG. 2) configuration for non-codebook based PUSCH transmission with multi-panel and multi-TRP. The scheme defined in Release 15 NR cannot support the scenario illustrated in FIG. 2.

One SRS resource set with at least two SRS resources can be configured by higher layer parameters with usage set to 'nonCodebook' if uplink transmission scheme is set to 'nonCodebook', and one or more NZP CSI-RS resources should be associated with this one SRS resource set, for example, NZP CSI-RS 0 and NZP CSI-RS 1 are associated with SRS resource set 0 as shown in FIG. 2. Only one SRS port can be configured for each SRS resource in the set. SRS resources in this set can be configured with different spatialRelationInfo values. SRS resources in this one SRS resource set with different spatialRelationInfo can be configured to the UE in the same RB for simultaneous transmission.

If the UE configured with aperiodic SRS associated with aperiodic NZP CSI-RS resource, qcl-info shall be configured for each CSI-RS resource in the SRS-config IE as shown in Table 2 for the UE to determine the QCL assumption to receive the associated CSI-RS.

Alt.2: The UE determines the QCL assumption according to the spatialRelationInfo parameter configured by higher layer parameters if qcl-info is not configured.

If the offset between the reception of the UL grant carrying the SRS request and the transmission of corresponding aperiodic NZP CSI-RS is less than the UE reported ThresholdSched-Offset, two alternatives are provided to determine the QCL assumption for the NZP CSI-RS reception:

Alt.1: The UE assumes that the NZP CSI-RS is quasi co-located with the RS(s) in the TCI state with respect to the QCL parameter(s) used for PDCCH quasi co-location indication of the lowest CORESET-ID in the latest slot in which one or more CORESETs within the active BWP of the serving cell are configured for the UE.

Alt.2: The UE assumes that the NZP CSI-RS is quasi co-located with the RS(s) in the TCI state with respect to the QCL parameter(s) used for PDCCH quasi co-location indication of the CORESET carrying the DCI including the SRS request.

Only one SRI field with two parts (e.g. SRI indication part 1 and SRI indication part 2 as shown in FIG. 2) is required in the UL grant to indicate the precoding matrix and transmission rank to schedule a multiple codewords (CW) (e.g. CW0 and CW1 as shown in FIG. 2) based PUSCH transmission. A codepoint of the SRI part in the SRI field is mapped to one or more SRI with the same spatialRelationInfo. The UE performs one to one mapping from the indicated SRI(s) to SRS resources with the same spatialRelationInfo value in increasing order.

TABLE 2

| qcl-Info for associated aperiodic NZP CSI-RS resource | |
|---|---|
| SRS-ResourceSet ::= | SEQUENCE { |
|   srs-ResourceSetId | SRS-ResourceSetId, |
|   srs-ResourceIdList | SEQUENCE (SIZE(1..maxNrofSRS-ResourcesPerSet)) OF SRS-ResourceId |
| OPTIONAL, -- Cond Setup | |
|   resourceType | CHOICE { |
|     aperiodic | SEQUENCE { |
|       aperiodicSRS-ResourceTrigger | INTEGER (1..maxNrofSRS-TriggerStates−1), |
|       csi-RS | NZP-CSI-RS-ResourceId |
| OPTIONAL, -- Cond NonCodebook | |
|       qcl-info0 | TCI-StateID |
| OPTIONAL, -- Need S | |
|       qcl-info1 | TCI-StateID |
| OPTIONAL, -- Need S | |
|       slotOffset | INTEGER (1..32) |
| OPTIONAL, -- Need S | |
|       ...; | |
|   }, | | qcl-Info
For the associated aperiodic NZP CSI-RS, it contains a reference to one TCI-State in TCI-States for providing the QCL source and QCL type.

In table 2, one csi-RS is associated with two qcl-info, i.e., qcl-info0 and qcl-info1, by which the application is not limited to, and a plurality of csi-RS being associated with a plurality of qcl-info are also available.

If the offset between the reception of the UL grant carrying the SRS request and the transmission of corresponding aperiodic NZP CSI-RS is equal or larger than the UE reported ThresholdSched-Offset, two alternatives are provided to determine the QCL assumption for the NZP CSI-RS reception:

Alt.1: The UE determines the QCL assumption according to the qcl-info parameter configured by higher layer parameters if qcl-info is configured.

All SRS resources with the same spatialRelationInfo are ordered by the increasing index for SRI indication. SRI indication defined in TS38.212 in Rel-15 is reused for each SRI part.

Taking 8 SRS resources in one SRS resource set for example, a UE is configured with the following SRS resource set.
SRS Resource Set:

{
SRS resource 0 with spatialRelationInfo0
SRS resource 1 with spatialRelationInfo1

-continued

```
       SRS resource 2 with spatialRelationInfo0
       SRS resource 3 with spatialRelationInfo1
       SRS resource 4 with spatialRelationInfo0
       SRS resource 5 with spatialRelationInfo1
       SRS resource 6 with spatialRelationInfo0
       SRS resource 7 with spatialRelationInfo1
    }
       SRI=0 in the first part maps to SRS resource 0.
       SRI=1 in the first part maps to SRS resource 2
       SRI=2 in the first part maps to SRS resource 4
       SRI=3 in the first part maps to SRS resource 6
       SRI=0 in the second part maps to SRS resource 1
       SRI=1 in the second part maps to SRS resource 3
       SRI=2 in the second part maps to SRS resource 5
       SRI=3 in the second part maps to SRS resource 7.
```

With this configuration, the number of selections of SRS resources from the set may be decreased from $(C_8^1 + C_8^2 + C_8^3 + C_8^4 + C_8^5 + C_8^6 + C_8^7)$ | $2(C_4^1 + C_4^2 + C_4^3)$, to therefore the overhead and computing complexity can be reduced.

Figure 3:
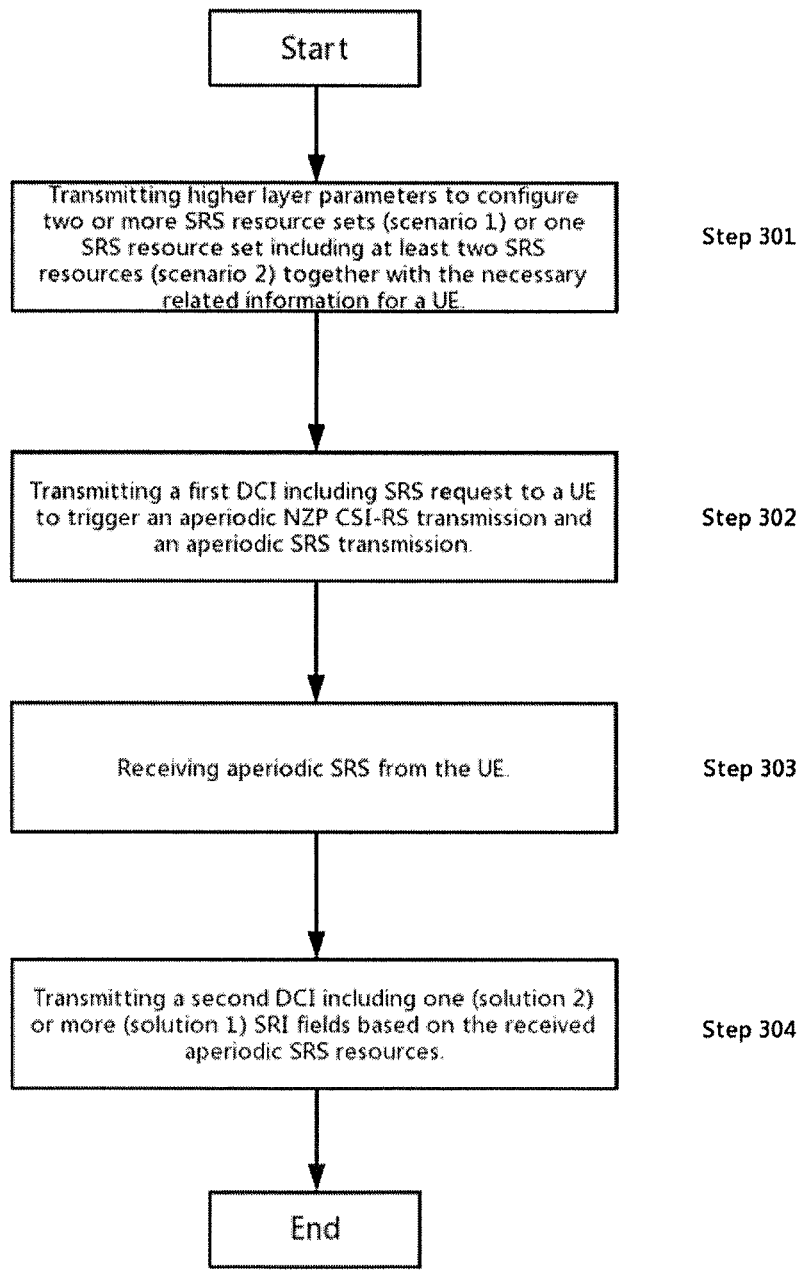
FIG. 3 is a flow chart diagram illustrating a method for a gNB to configuring SRS resource sets according to one embodiment.

FIG. 3 is a schematic flow chart diagram illustrating a method for a gNB to configure the SRS resource sets according to one embodiment.

As illustrated in FIG. 3, the method for a gNB to configure the SRS resource sets for a UE and transmit the same is shown.

At step 301, the gNB transmits higher layer parameters to configure two or more SRS resource sets (scenario 1) or one SRS resource set including at least two SRS resources (scenario 2) together with the necessary related information for the UE.

At step 302, the gNB transmits a first DCI including SRS request to a UE to trigger an aperiodic NZP CSI-RS transmission and an aperiodic SRS transmission.

At step 303, the gNB receives aperiodic SRS from the UE.

At step 304, the gNB transmits a second DCI including one (solution 2) or more (solution 1) SRI fields based on the received aperiodic SRS resources.

The detail SRS resource sets configuration progress is described with reference to FIGS. 1 and 2.

Figure 4:
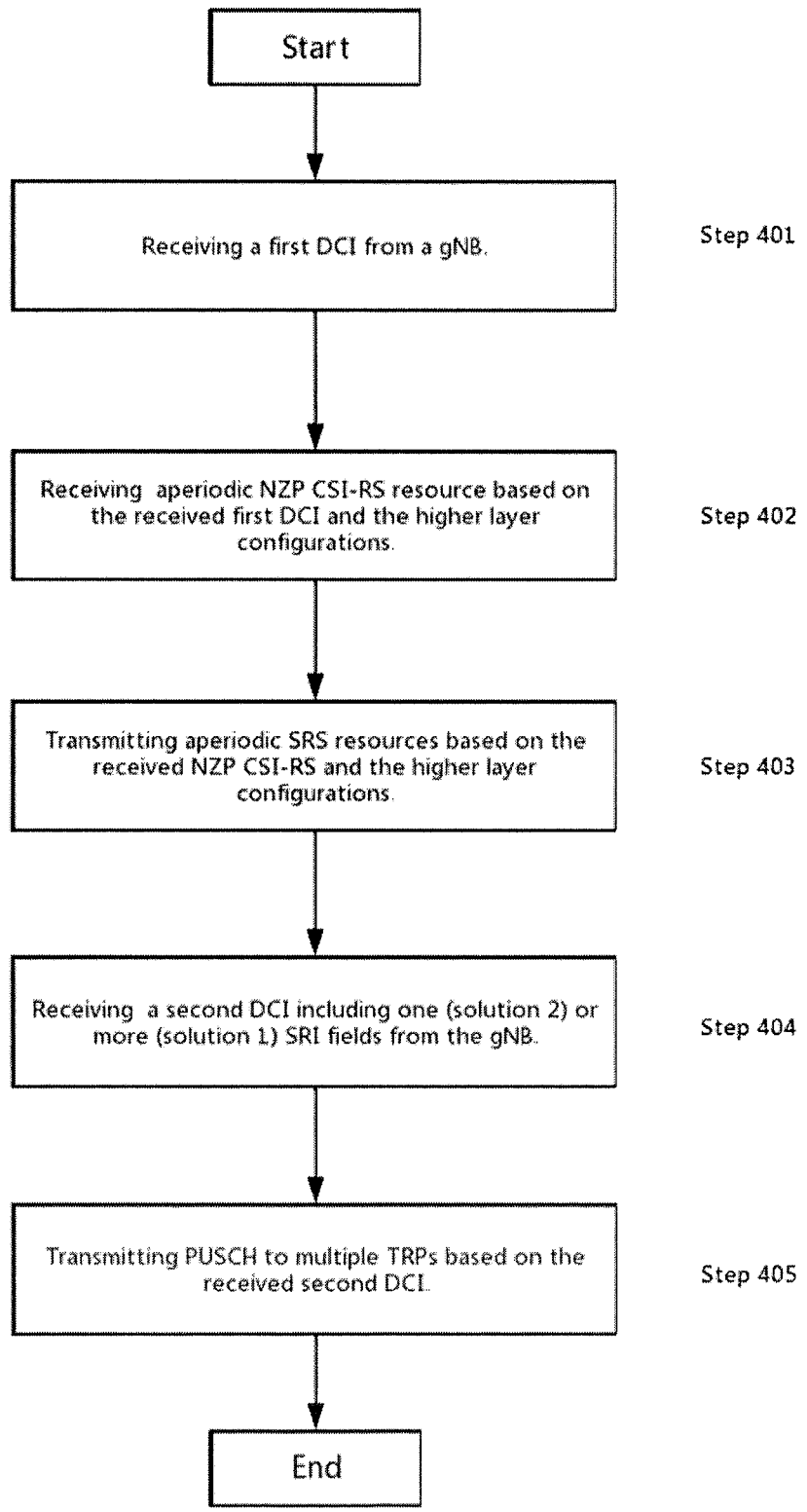
FIG. 4 is a flow chart diagram illustrating a method for a UE to determine the SRS resource sets configuration according to one embodiment.

FIG. 4 is a schematic flow chart diagram illustrating a method for a UE to determining the SRS resource sets according to one embodiment.

As illustrated in FIG. 4, the method for a UE to determine the SRS resource sets according to the data from a gNB is shown.

At step 401, a UE receives a first DCI from a gNB.

At step 402, the UE receives aperiodic NZP CSI-RS resource based on the received first DCI and the higher layer parameters.

At step 403, the UE transmits aperiodic SRS resources based on the received NZP CSI-RS and the higher layer parameters.

At step 404, the UE receives a second DCI including one (solution 2) or more (solution 1) SRI fields from the gNB.

At step 405, the UE transmits PUSCH to multiple TRPs based on the received second DCI.

The way by which the UE determines the QCL assumption has been described with reference to FIGS. 1 and 2.

Figure 5:
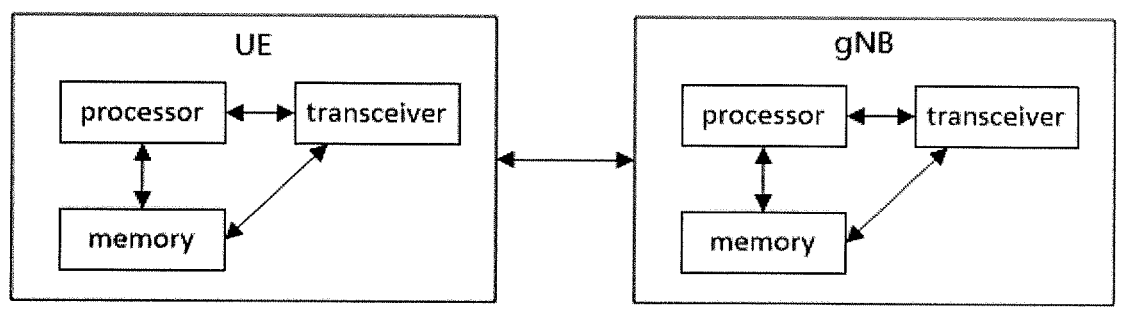
FIG. 5 is a schematic block diagram illustrating apparatuses according to one embodiment.

FIG. 5 is a schematic block diagram illustrating a UE and gNB.

Referring to FIG. 5, The UE includes a processor, a memory, and a transceiver. The processor implements a function, a process, and/or a method which are proposed in FIGS. 1 to 4 above. The gNB includes a processor, a memory, and a transceiver. The processors implement a function, a process, and/or a method which are proposed in FIGS. 1 to 4 above. Layers of a radio interface protocol may be implemented by the processors. The memories are connected with the processors to store various pieces of information for driving the processors. The transceivers are connected with the processors to transmit and/or receive a radio signal.

The memories may be positioned inside or outside the processors and connected with the processors by various well-known means. Further, the relay node may have a single antenna or multiple antennas.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

This disclosure proposes two SRS configuration schemes to support a non-codebook based PUSCH transmission with multi-panel and/or multi-beam. According to the embodiments described above, two or more SRS resource sets are configured for a non-codebook based UL transmission, wherein the SRS resources in one set is configured with the same spatialRelationInfo value, and the SRS resources in different sets can be transmitted simultaneously. One SRS resource set with at least two SRS resources is configured for a non-codebook based UL transmission, wherein the SRS resources with different spatialRelationInfo values can be transmitted simultaneously. Two or more NZP CSI-RS resources can be configured for one SRS resource set for non-codebook. The gNB should configure the qcl-info for associated NZP CSI-RS resource to determine the QCL assumption for the reception of NZP CSI-RS. The embodiments further describe the method for a UE to determine the QCL assumption for the reception of NZP CSI-RS for different schedule offsets and the method for a UE to determine the SRS resources for PUSCH transmission according to the one SRI field with two parts.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a base station, the method comprising:

transmitting higher layer parameters to a user equipment (UE) to configure two or more sounding reference signal (SRS) resource sets for a non-codebook based physical uplink share channel (PUSCH) transmission, wherein each SRS resource set is associated with a non-zero power (NZP) channel state information reference signal (CSI-RS) resource, a first SRS resource set of the two or more SRS resource sets is associated with a first uplink (UL) transmit (TX) beam for the UE, a second SRS resource set of the two or more SRS resource sets is associated with a second UL TX beam for the UE, and the first UL TX beam and the second UL TX beam are configured for simultaneous transmission associated with the first SRS resource set and the second SRS resource set;

configuring quasi-colocation (QCL) information that indicates a receiver beam to receive each NZP CSI-RS resource and only one SRS port can be configured for the each SRS resource set;

transmitting the QCL information; and transmitting a downlink control information (DCI) with two or more sounding reference signal SRS resource indicator (SRI) fields to schedule a non-codebook based PUSCH transmission, wherein each SRI field of the two or more SRI fields is associated with one or more SRS resources within the first or the second SRS resource set.

2. The method of claim 1, wherein:

the higher layer parameters configure one SRS resource set including at least two SRS resources for a non-codebook based PUSCH transmission with different spatial relation information; and the method further comprises:
configuring and transmitting the one or more NZP CSI-RS resources associated with the one SRS resource set; and
configuring and transmitting the QCL information for each of the NZP CSI-RS resources in response to an aperiodic NZP CSI-RS resource being associated with the SRS resource set.

3. The method of claim 2, further comprising transmitting DCI with one SRI field including two or more parts to schedule the non-codebook based PUSCH transmission.

4. A method performed by a user equipment (UE), the method comprising:

receiving higher layer parameters for configuring two or more sounding reference signal (SRS) resource sets for non-codebook based uplink (UL) transmission, wherein each SRS resource set is associated with one non zero power (NZP) channel state information reference signal (CSI-RS) resource, a first SRS resource set of the two or more SRS resource sets is associated with a first uplink (UL) transmit (TX) beam for the UE, a second SRS resource set of the two or more SRS resource sets is associated with a second UL TX beam for the UE, and the first UL TX beam and the second UL TX beam are configured for simultaneous transmission associated with the first SRS resource set and the second SRS resource set;

receiving quasi-colocation (QCL) information that indicates a receiver beam to receive each NZP CSI-RS resource and only one SRS port can be configured for the each SRS resource set; and receiving a downlink control information (DCI) including two or more sounding reference signal resource indicator (SRI) fields to schedule a non-codebook based PUSCH transmission, wherein each SRI field of the two or more SRI fields is associated with one or more SRS resources within the first or the second SRS resource set.

5. The method of claim 4, wherein the SRS resources in the same SRS resource set are configured with the same spatial relation information.

6. The method of claim 4, wherein:

the higher layer parameters are for configuring one SRS resource set for non-codebook based UL transmission, the one SRS resource set is associated with one or more NZP CSI-RS resources.

7. The method of claim 6, wherein at least two SRS resources with different spatial relation information can be configured in the SRS resource set.

8. The method of claim 4, further comprising determining a QCL assumption to receive associated NZP CSI-RS resource according to a transmission configuration indicator (TCI) state configured for a control resource set (CORESET) with the lowest CORESET identifier (ID) (CORESET-ID) in the latest slot in which one or more CORESETs within an active bandwidth part (BWP) of a serving cell are configured for the UE in response to an offset between reception of the DCI triggering the NZP CSI-RS resource and the transmission of corresponding aperiodic NZP CSI-RS being less than a threshold.

9. The method of claim 6, further comprising performing one to one mapping from indicated SRIs to SRS resources with the same spatial relation information value in increasing order.

10. A user equipment (UE), comprising:

at least one memory; and
at least one processor coupled with the at least one memory and configured to cause the UE to:
receive higher layer parameters for configuring two or more sounding reference signal (SRS) resource sets for non-codebook based uplink (UL) transmission, wherein each SRS resource set is associated with one non zero power (NZP) channel state information reference signal (CSI-RS) resource, a first SRS resource set of the two or more SRS resource sets is associated with a first uplink (UL) transmit (TX) beam for the UE, a second SRS resource set of the two or more SRS resource sets is associated with a second UL TX beam for the UE, and the first UL TX beam and the second UL TX beam are configured for simultaneous transmission associated with the first SRS resource set and the second SRS resource set;
receive quasi-colocation (QCL) information that indicates a receiver beam to receive each NZP CSI-RS resource and only one SRS port can be configured for the each SRS resource set; and
receive a downlink control information (DCI) including two or more sounding reference signal resource indicator (SRI) fields to schedule a non-codebook based PUSCH transmission, wherein each SRI field of the two or more SRI fields is associated with one or more SRS resources within the first or the second SRS resource set.

11. The UE of claim 10, wherein the SRS resources in the same SRS resource set are configured with the same spatial relation information.

12. The UE of claim 10, wherein:

the higher layer parameters are for configuring one SRS resource set for non-codebook based UL transmission, the one SRS resource set is associated with one or more NZP CSI-RS resources.

13. The UE of claim 10, wherein at least two SRS resources with different spatial relation information can be configured in the SRS resource set.

14. The UE of claim 10, wherein the at least one processor is configured to cause the UE to determine a quasi co-location (QCL) assumption to receive associated NZP CSI-RS resource according to a transmission configuration indicator (TCI) state configured for a control resource set (CORESET) with the lowest CORESET identifier (ID) (CORESET-ID) in the latest slot in which one or more CORESETs within an active bandwidth part (BWP) of a serving cell are configured for the UE in response to an offset between reception of the DCI triggering the NZP CSI-RS resource and the transmission of corresponding aperiodic NZP CSI-RS being less than a threshold.

15. The UE of claim 12, wherein the at least one processor is configured to cause the UE to perform one to one mapping from indicated SRIs to SRS resources with the same spatial relation information value in increasing order.

16. The method of claim 1, wherein the SRS resources in the same SRS resource set are configured with the same spatial relation information.

17. A processor for wireless communication, comprising:
at least one controller coupled with at least one memory and configured to cause the processor to:
receive higher layer parameters for configuring two or more sounding reference signal (SRS) resource sets for non-codebook based uplink (UL) transmission, wherein each SRS resource set is associated with one non zero power (NZP) channel state information reference signal (CSI-RS) resource, a first SRS resource set of the two or more SRS resource sets is associated with a first uplink (UL) transmit (TX) beam for the processor, a second SRS resource set of the two or more SRS resource sets is associated with a second UL TX beam for the processor, and the first UL TX beam and the second UL TX beam are configured for simultaneous transmission associated with the first SRS resource set and the second SRS resource set;
receive quasi-colocation (QCL) information that indicates a receiver beam to receive each NZP CSI-RS resource and only one SRS port can be configured for the each SRS resource set; and
receive downlink control information (DCI) including two or more sounding reference signal resource indicator (SRI) fields to schedule a non-codebook based PUSCH associated with one or more SRS resources within the first or the second SRS resource set.

* * * * *